United States Patent [19]

Klaussner

[11] Patent Number: 4,783,901

[45] Date of Patent: Nov. 15, 1988

[54] APPARATUS FOR SEPARATING ELECTRICAL CONNECTING ELEMENTS ON SUPPORT STRIPS

[76] Inventor: Hans-Jurgen Klaussner, Via Lungo Lago 2-4, XXV aprile, I-21037 Lavena/Ponte Tresa, Italy

[21] Appl. No.: 53,747

[22] Filed: May 26, 1987

[30] Foreign Application Priority Data

May 31, 1986 [CH] Switzerland ........................ 02203/86

[51] Int. Cl.$^4$ ........................ B23P 23/00; H01R 43/00

[52] U.S. Cl. ........................................ 29/566.2; 29/749

[58] Field of Search ................. 29/564.6, 564.8, 564.4, 29/566.2, 566.3, 566.1, 753, 749

[56] References Cited

U.S. PATENT DOCUMENTS

| | | | |
|---|---|---|---|
| 3,484,922 | 12/1969 | Fritz et al. | 29/566.2 |
| 3,839,776 | 10/1974 | Miderson et al. | 29/564.4 |
| 4,272,879 | 6/1981 | Wigby et al. | 29/566.2 |
| 4,335,497 | 6/1982 | Casey | 29/566.3 X |
| 4,363,167 | 12/1982 | Boutcher | 29/749 X |
| 4,654,952 | 4/1987 | Baldyga | 29/566.2 |

*Primary Examiner*—William R. Briggs

*Attorney, Agent, or Firm*—Burns, Doane, Swecker & Mathis

[57] ABSTRACT

Apparatus for connecting extremely short conductor ends to electrical connecting elements, such as e.g. clamps and/or plugs is described. A separating device can be integrated into a conventional stripping and crimping apparatus. The latter has a common pair of clamping jaws, the lower clamping jaw having a cutting edge facing an anvil for separating the electrical connecting elements from a support strip. A support strip supply means is provided in such a way that the support strip can be introduced into a separating device located outside the crimping zone. This space-saving construction makes it possible to considerably reduce the necessary conductor insertion depth.

5 Claims, 1 Drawing Sheet

APPARATUS FOR SEPARATING ELECTRICAL CONNECTING ELEMENTS ON SUPPORT STRIPS

FIELD OF THE INVENTION

The invention relates generally to an apparatus for attaching connector elements to wire or cable conductors.

BACKGROUND OF THE INVENTION

Increasing difficulties are being encountered in connecting extremely short conductor ends to electrical connecting elements, such as e.g. clips and/or plugs, as a result of the ever-increasing miniaturization of such components.

In order to ensure rational manufacture, various methods are already known for supplying the conductor clips/clamps or plugs in strip form to a plug separating device. In conjunction with a stripping apparatus, a relatively large amount of space is required, because the particular conductor clamping jaws must be located upstream of the plug separating device.

A disadvantage is that relatively long conductor ends are unavoidable and an optimum working sequence is only possible to a limited extent, support strip waste occurring in the crimping zone in an uncontrolled manner thus giving rise to faults.

It would be beneficial to provide an apparatus permitting a troublefree separation of the connecting elements and the support strip and which enables very short conductor ends to be worked in an optimum manner.

OBJECTS AND SUMMARY OF THE INVENTION

It is an object of the present invention to provide such a beneficial apparatus which solves the problems discussed above.

One advantage of the inventive apparatus is that in a first working process the conductor end stripped in a stripping apparatus is connected to the conductor clip or plug and separated by the lower clamping jaw from the support strip, and in a second working cycle controlled by the lower clamping jaw, the remainder of the support strip is subdivided into portions corresponding to the distances or spacings between the individual connecting elements.

Another advantage is that, in conjunction with the stripping apparatus described in Swiss patent application, No. 02202/86-3, filed on May 31, 1986, and in U.S. patent application Ser. No. 053,748, entitled "Apparatus for Stripping Electrical Conductors", filed on May 26, 1987 and claiming the Swiss priority an, exact and speedy conductor stripping and joining apparatus is provided, in which adjustment and setting operations can be reduced to a minimum.

Compared with the hitherto conventional apparatuses, it is possible by using a single pair of clamping jaws, in which the lower edge of the lower clamping jaw is constructed as a cutting edge cooperating with an anvil of the crimping device, to secure, crimp and separate the conductor clips from the support strip, as well as chop the support strip outside the crimping zone. Such a space-saving construction makes it possible to significantly reduce the conductor insertion depth.

BRIEF DESCRIPTION OF THE DRAWING

An embodiment of the invention is described in greater detail hereinafter relative to the drawings, wherein.

DETAILED DESCRIPTION OF A PREFERRED EMBODIMENT

Figure 1:
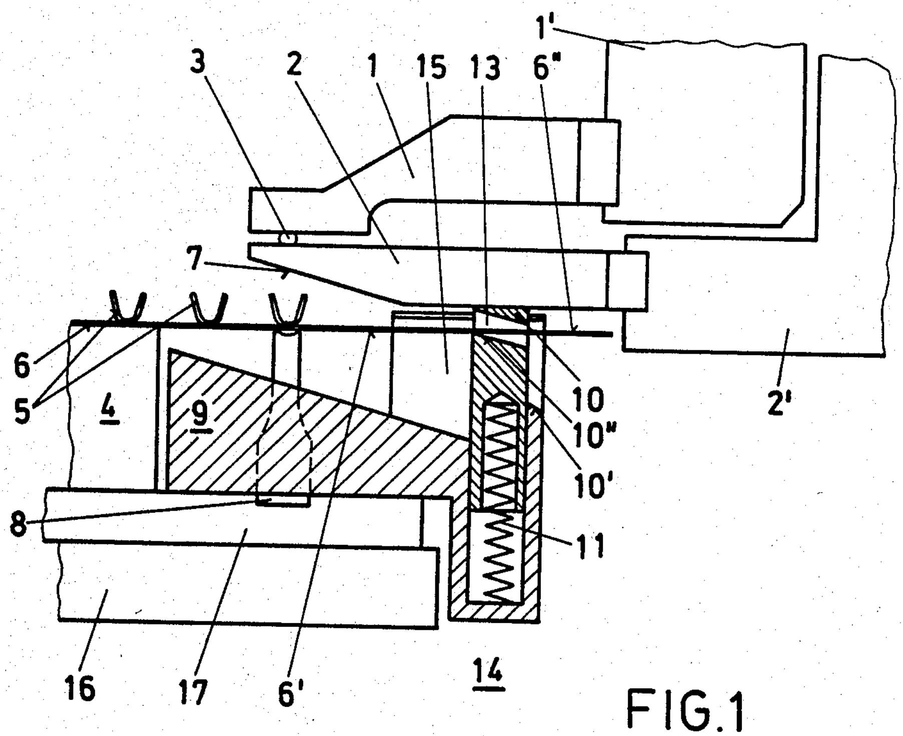
FIG. 1 is a partial sectional view of the inventive apparatus.
Figure 2:
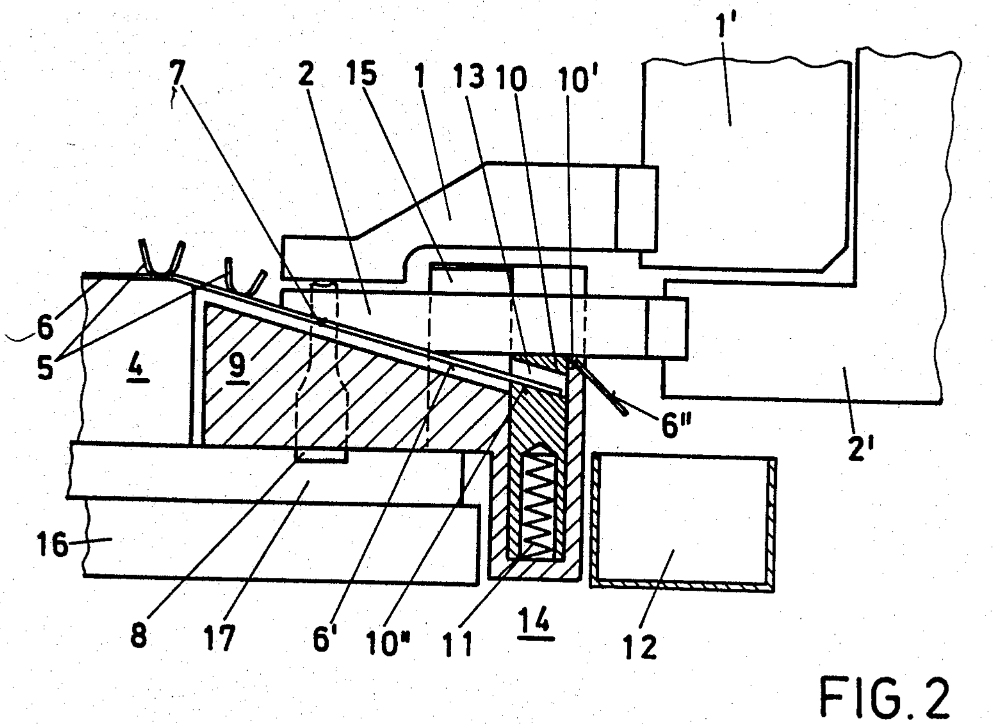
FIG. 2 is a partial sectional view of the apparatus according to FIG. 1 with a lowered support strip.

According to FIGS. 1 and 2 there is a pair of clamping jaws 1, 2, in which is fixed a conductor 3. By means of a feeding device which is not shown, a support strip supply means 4 supplies a support strip 6, e.g. equipped with conductor clips or clamps 5. The lower clamping jaw 2 has a lower edge constructed as a cutting edge 7, which strikes against an anvil 8 for separating conductor clamp 5 from support strip 6. A support strip guide 9 is provided which is lowered with respect to the support strip supply means 4, which supplies the conductor clamp-free part 6' of support strip 6 to a separating device 14 with knives 10, 10', a spring-loaded, movable knife part 10 cooperating with a fixed knife part 10'. Through the force of a spring 11 and the simultaneous closing of clamping jaws 1, 2, the support strip 6 is raised into the horizontal feed position by means of a raising edge 10" of separating device 14. During the lowering movement of clamping jaws 1, 2 (cf. FIG. 2), the lower edge of the lower clamping jaw 2, constructed as a cutting edge 7, separates the conductor clamp 5 from support strip 6 and the lower clamping jaw simultaneously forces the movable knife part 10 of separating device 14 downward and presses the support strip ends 6" located in a support strip insertion opening 13 against the fixed knife part 10'. The strip ends 6" then drop into a waste container 12.

The apparatus is located on a fixing plate 17 connected to a base plate 16 and a guide 15 of clamping jaw 2 ensures a troublefree cooperation of the latter with separating device 14. The control of clamping jaws 1, 2 and separating device 14 can e.g. take place wit the control means for the crimping and support strip supply means 4.

While this invention has been illustrated and described in accordance with a preferred embodiment, it is recognized that variations and changes may be made and equivalents employed herein without departing from the invention as set forth in the claims.

What is claimed is:

1. Apparatus for separating electrical connecting elements from a support strip and fixing the electrical connecting elements to the ends of conductors, comprising, a stripping unit having upper and lower clamping jaws, a crimping unit having an anvil located in a crimping zone and support strip supply means for supplying a support means supporting electrical connecting elements to said crimping zone, said lower clamping jaw having a cutting edge facing said anvil, said cutting edge being movable toward said anvil to separate one of said electrical connecting elements which is adjacent said anvil from said support means, and a separating unit positioned outside said crimping zone and including a support strip guide for guiding said support strip into said separating device so that an end portion of said support strip which no longer supports electrical connecting elements may be separated from said support strip.

2. The apparatus in accordance with claim 1, wherein said separating unit includes two cooperating cutting edges and a raising edge for guiding said support strip end portion between said cutting edges.

3. The apparatus in accordance with claim 1, wherein said separating unit is lowerable relative to said crimping zone and includes a support strip insertion opening between said cutting edges.

4. The apparatus in accordance with claim 3, wherein said separating unit is operated by being moved to said lowered position, said lower clamping jaw being in contact with said separating unit and vertically movable in a guide to move said separating unit to said lowered position.

5. The apparatus in accordance with claim 1, wherein said support strip guide has a guide surface which is angled downwardly in the direction of travel of said support strip and said support strip insertion opening extends in a direction parallel to said guide surface.

* * * * *